A. H. FRANKE.
OIL FILTER AND PURIFIER.
APPLICATION FILED JUNE 1, 1908.
911,388. Patented Feb. 2, 1909.
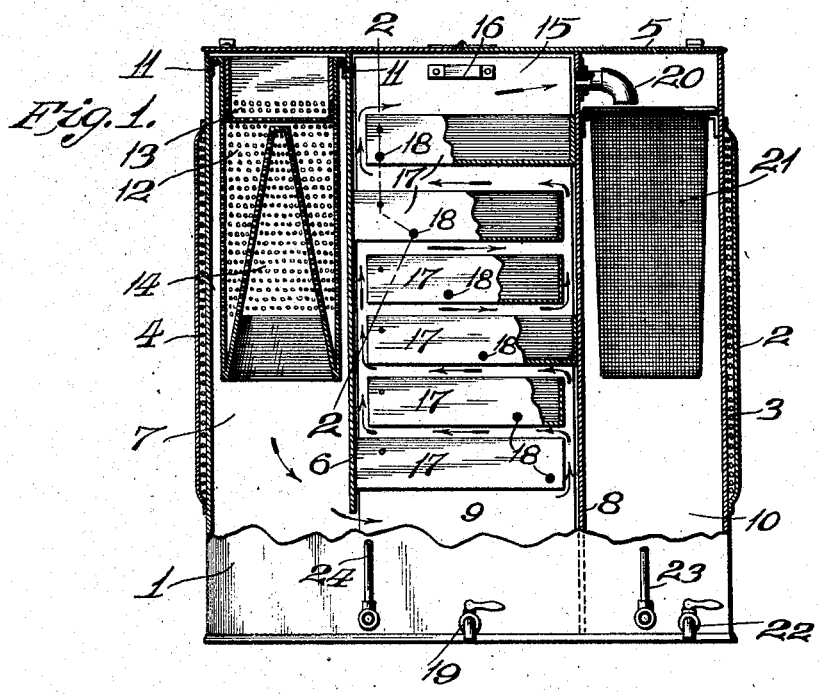
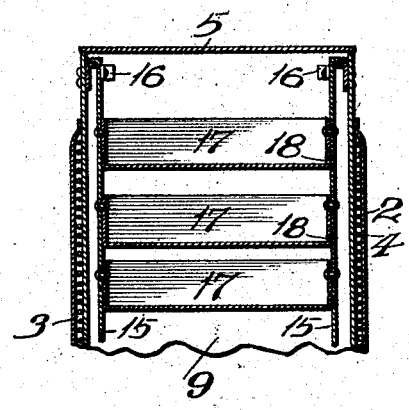
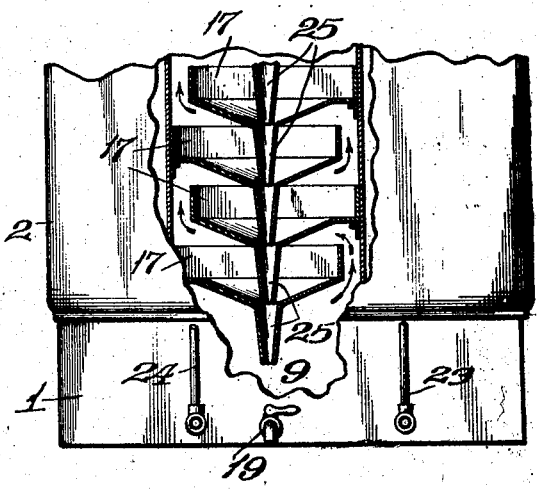
attest.
H. G. Fletcher.
M. P. Smith.
Inventor,
August H. Franke.
By Higdon & Longan,
attys.

UNITED STATES PATENT OFFICE.

AUGUST H. FRANKE, OF ST. LOUIS, MISSOURI.

OIL FILTER AND PURIFIER.

No. 911,388.     Specification of Letters Patent.     Patented Feb. 2, 1909.

Application filed June 1, 1908. Serial No. 436,148.

*To all whom it may concern:*

Be it known that I, AUGUST H. FRANKE, a citizen of the United States, and resident of St. Louis, Missouri, have invented certain new and useful Improvements in Oil Filters and Purifiers, of which the following is a specification containing a full, clear, and exact description, reference being had to the accompanying drawings, forming a part hereof.

My invention relates to an apparatus for filtering and purifying oil, the object of my invention being to construct a simple, inexpensive apparatus which will thoroughly strain, filter and purify dirty oil, and in which filter and purifier all the impurities will by gravity pass into the lower portion of the filtering chamber, from which point they may be readily withdrawn, as desired.
A further object of my invention is to provide means whereby the filtering and purifying apparatus is heated while the oil is passing therethrough, in order that said oil will flow more freely, and that the straining, precipitating and filtering operations will be more readily carried out.

To the above purposes, my invention consists in certain novel features of construction and arrangement of parts, which will be hereinafter more fully set forth, pointed out in the claims, and illustrated in the accompanying drawings, in which:

Figure 1 is a vertical section taken through the center of an oil filter and purifier of my improved construction; Fig. 2 is a vertical section taken on the line 2—2 of Fig. 1; and Fig. 3 is a front elevation of the lower portion of a modified form of the filter and purifier.
Referring by numerals to the accompanying drawings: 1 designates the body of the filter, which is in the form of a rectangular receptacle constructed of heavy sheet metal, and the central portion of the body of which is provided with a jacket 2 to provide steam or hot water space 3, utilized for heating the oil as it passes through the filter, or said space may be occupied by an electric heating coil 4.
The top 5 of the filter is made in two parts, hinged to one another at the middle, and arranged in the left-hand portion of the body of the filter is a vertically disposed partition 6, the lower end of which terminates a short distance above the bottom of the filter, and thus a straining chamber 7 is formed in the left-hand portion of the body 1. A vertically disposed partition 8 extends from the top 5 to the bottom of the body 1, said partition being arranged between the partition 6 and the right-hand side wall of said body 1, thus forming a centrally arranged precipitating chamber 9, and a clean oil chamber 10.

Arranged in the upper portion of the chamber 7 upon the partition 6 and the adjacent end wall of the body 1 are metal cleats 11, which support a reticulated metal strainer 12, in the upper portion of which is arranged a horizontally disposed perforated partition 13, and in the lower portion of which is arranged an inverted V-shaped reticulated partition 14. All of the dirty oil to be filtered and purified is delivered into the upper end of this strainer 12, and said strainer catches and retains all of the heavier or coarser impurities with which said oil is impregnated.

15 designates a pair of vertically disposed plates, which normally occupy positions on opposite sides of the chamber 9, which plates are removable, and are provided at their upper ends with handles 16, and fixed to said plates is a series of precipitating pans 17, of sheet metal, which pans are slightly offset relative to one another, in order that the oil passing upward through the chamber 9 will flow from end to end over and through said pans in passing from the lower portion of the chamber 9 to the upper end thereof.

Formed through the front walls of these pans 17 immediately above the bottoms thereof, are drainage apertures 18, which permit the precipitated water and sediment lodging in said pans to discharge and pass downward to the bottom of the chamber 9.

Fixed in the lower portion of the front wall of the body 1 and leading from the bottom of the chamber 9 is a faucet 19, through which the precipitated water and sediment may be discharged from the precipitating and separating chamber.

Fixed in the upper portion of the partition 8 and leading from the upper end of the chamber 9 into the upper portion of the chamber 10 is a tubular elbow 20, and removably positioned in the upper portion of the chamber 10 is a filter bag 21, of closely woven fabric.

Fixed in the front wall of the body 1 and leading from the lower end of the chamber 10 is a faucet 22, through which the clean oil is drawn from the chamber 10, and arranged on the front side of the body 1 immediately in front of the chamber 10 is a gage-glass 23, and there being a corresponding gage-glass 24 arranged on the front of the body 1 immediately adjacent the partition 6.

In the modified form of the apparatus seen in Fig. 3, the bottoms of the precipitating pans 18 are provided with funnel-shaped drainage spouts 25, which discharge into one another, and the lowermost one of which discharges into the lower portion of the precipitating chamber 9.

When my improved apparatus is in use, the oil to be filtered and purified is delivered into the upper portion of the strainer 12, and in passing therethrough the coarser impurities are caught and the dirty oil passes downward through the lower portion of the chamber 7 beneath the lower end of the partition 6, and rises through the precipitating chamber 9. As the oil rises or flows upward through this precipitating chamber, it will successively pass over and through the pans 18, and during this flow or travel all of the water and heavier impurities which are carried in suspension in said oil will by gravity pass onto the bottoms of the precipitating pans, and as a result the oil, relieved of the water and impurities, will discharge through the tubular elbow into the filtering bag 21, and in passing therethrough all the lighter impurities are removed from the oil, and thus perfectly clean oil enters the compartment or reservoir 10.

While the filter is in use, the oil passing therethrough can be heated by means of steam or hot water delivered to the compartment within the jacket 2, or by means of the electric heating coil, thereby greatly increasing the flow of the oil through the filter. The clean oil is drawn from the compartment or reservoir 10 through the faucet 22, and the precipitated water and impurities are drawn from the chamber 9 through the faucet 19, and which water and impurities discharge from the pans 17 through the drainage apertures 18 and gravitate to the bottom of said chamber 9. The strainer, precipitating pans and filter bag can readily be removed from the body of the filter when it is desired to clean the interior of the same and the removable parts.

The precipitating pans provide simple means for removing all of the water and heavier impurities from the oil, as by utilizing said pans the body of oil is caused to flow or travel in a number of horizontal strata in its passage through the precipitating compartment, and the water and sediment has but a short distance to fall or gravitate in each stratum, and thereby the precipitation is very rapidly accomplished, and comparatively clean oil discharges from the upper end of the compartment 9 into the filtering bag 21.

I claim:—

1. An oil filter and purifier, a receptacle, a series of horizontally disposed precipitating pans arranged one above the other in the receptacle, over which pans the oil to be purified flows in horizontal strata, there being water and sediment drainage apertures formed in the side walls of said pans immediately above the bottoms thereof; and means whereby the entire body of oil is heated during its travel over said pans.

2. The herein described oil filter and purifier comprising a receptacle divided into a series of compartments, a strainer detachably positioned in the upper end of one compartment, a series of horizontally disposed precipitating pans arranged in the central one of the compartments, which precipitating pans are so positioned as that the oil to be purified will flow in horizontal strata between said pans, a filter bag detachably positioned in the upper end of the remaining compartments, and means whereby the entire volume of oil in the receptacle is heated during its passage through said receptacle.

3. The herein described oil filter and purifier, comprising a receptacle, partitions arranged in the receptacle and dividing the same into compartments, a strainer detachably positioned in the upper end of one of the compartments, a series of horizontally disposed precipitating pans arranged in the central one of the compartments, which pans are so disposed as that the oil to be purified will flow in horizontal strata between the pans, there being water and sediment drainage apertures formed in the side walls of said pans adjacent the bottoms thereof, a filter bag detachably positioned in the upper end of the remaining compartment, there being an outlet formed in the partition between the compartment containing the pans and the compartment containing the filter bag, and there being outlets formed at the lower ends of the last mentioned compartments, and means whereby the entire volume of oil in the receptacle is heated during its passage through said receptacle.

4. In an oil filter and purifier, a receptacle provided with a centrally disposed precipitating compartment, a series of horizontally disposed precipitating pans arranged one above the other in the precipitating compartment, there being drainage apertures formed in the side walls of said pans immediately above the bottoms thereof, and means whereby the entire body of oil is heated during its passage through the compartment provided with the precipitating pans.

5. In an oil filter and purifier, a recepta cle provided with a centrally disposed precipitating compartment, a series of horizontally disposed precipitating pans arranged one above the other in the precipitating compartment, and there being drainage apertures formed in said pans whereby the water and sediment precipitated onto the pans is permitted to discharge from one pan to the other and to finally pass to the bottom of the precipitating compartment, and means whereby the entire body of oil is heated during its passage through the filter.

In testimony whereof, I have signed my name to this specification, in presence of two subscribing witnesses.

AUGUST H. FRANKE.

Witnesses:
M. P. SMITH,
E. L. WALLACE.